United States Patent
Yang et al.

(10) Patent No.: US 9,945,698 B2
(45) Date of Patent: Apr. 17, 2018

(54) MACRO-MICRO COMPOSITE GRATING RULER MEASURING SYSTEM AND MEASURING METHOD USING SAME COMPRISING A MACRO-SCALE READING MODULE, A MICRO-SCALE READING MODULE AND A MEASURING REFERENCE LINE

(71) Applicant: Guangdong University of Technology, Guangzhou (CN)

(72) Inventors: Zhijun Yang, Guangzhou (CN); Youdun Bai, Guangzhou (CN); Xin Chen, Guangzhou (CN); Jian Gao, Guangzhou (CN); Haidong Yang, Guangzhou (CN); Meng Wang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 28 days.

(21) Appl. No.: 15/114,087

(22) PCT Filed: Sep. 24, 2014

(86) PCT No.: PCT/CN2014/087287
§ 371 (c)(1),
(2) Date: Jul. 26, 2016

(87) PCT Pub. No.: WO2015/188515
PCT Pub. Date: Dec. 17, 2015

(65) Prior Publication Data
US 2017/0003147 A1     Jan. 5, 2017

(30) Foreign Application Priority Data

Jun. 10, 2014  (CN) .......................... 2014 1 0255806

(51) Int. Cl.
*G01D 5/347*     (2006.01)

(52) U.S. Cl.
CPC ..... *G01D 5/34707* (2013.01); *G01D 5/34746* (2013.01)

(58) Field of Classification Search
CPC .............................. G01D 5/347; G01B 11/02
(Continued)

(56) References Cited

U.S. PATENT DOCUMENTS

| 4,152,579 | A | * | 5/1979 | Feinland | ................ | G01D 5/244 |
| | | | | | | 177/DIG. 6 |
| 6,333,511 | B1 | | 12/2001 | Talmi | | |
| 2008/0106747 | A1 | | 5/2008 | Kudo et al. | | |

FOREIGN PATENT DOCUMENTS

| CN | 1731083 A | 2/2006 |
| CN | 102095378 A | 6/2011 |

(Continued)

OTHER PUBLICATIONS

International Search Report based on Application No. PCT/CN2014/08728 (3 Pages and 3 Pages of English translation) dated Feb. 26, 2015.

*Primary Examiner* — Que T Le
(74) *Attorney, Agent, or Firm* — Wayne & King LLC

(57) ABSTRACT

The present disclosure relates to a macro-micro composite grating ruler measuring system based on conversion and amplification in vertical and horizontal directions. The macro-micro composite grating ruler includes a grating ruler, a macro-micro reading system moving with respect to the grating ruler, and a counting and image processing module. The macro-micro reading system faces grating strip datum and is parallel to the grating ruler. The system further includes a measuring reference line. The measuring reference line obtained by the image sensor together with grating strips forms an image overlap in the counting and image processing module. The measuring reference line and the grating strip jointly include an angle θ. With the foregoing (Continued)

configuration, the present invention is compatible with the existing incremental grating rulers and absolute grating rulers, so is highly applicable.

10 Claims, 5 Drawing Sheets

(58) Field of Classification Search
USPC .............................. 250/231.13, 208.1, 214 R
See application file for complete search history.

(56) References Cited

FOREIGN PATENT DOCUMENTS

| | | |
|---|---|---|
| CN | 102095379 A | 6/2011 |
| CN | 202770411 U | 3/2013 |
| CN | 103411635 A | 11/2013 |
| CN | 103994723 A | 8/2014 |
| CN | 203869666 U | 10/2014 |

* cited by examiner ial directions, the macro-micro composite grating ruler measuring system including a grating ruler, a macro-micro reading system moving with respect to the grating ruler, and a counting and an image processing module, and being characterized in:
MACRO-MICRO COMPOSITE GRATING RULER MEASURING SYSTEM AND MEASURING METHOD USING SAME COMPRISING A MACRO-SCALE READING MODULE, A MICRO-SCALE READING MODULE AND A MEASURING REFERENCE LINE

RELATED APPLICATIONS

The present application is a national stage entry according to 35 U.S.C. § 371 of PCT application No.: PCT/CN2014/087287 filed on Sep. 24, 2014, which claims priority from China Patent application No.: 201410255806.5 filed on Jun. 10, 2014, and is incorporated herein by reference in its entirety.

TECHNICAL FIELD

The present disclosure relates to optical measurement of length, and more particularly to a macro-micro composite grating ruler measuring system based on conversion and amplification in vertical and horizontal directions.

BACKGROUND

A grating ruler is a feedback-based measuring device relying on the optical principle of optical gratings, and is usually used in closed loop position control systems as a testing apparatus, particularly in the fields of precision processing and manufacturing. The basic principle on which a grating ruler works is that the relative movement between the ruler and its scanning mask forms a Moire pattern under light. The Moire pattern is converted into similar sine and cosine electric signals by a photoelectric sensor. These signals are the original scanning signals of the optical grating. Then, by using different electronic subdivision methods, counting pulse signals with different measuring pitches can be obtained. These pulse signals are generally two mutually orthogonal signals. The two signals are fed into a downstream reversible counter circuit. Then the reading of the counter is multiplied by the measuring pitch to get the displacement value of the grating ruler.

A common way to enhance precision of displacement measurement is to increase the density of the graduation of the optical grating so as to significantly increase the amount of data collected. However, in occasions where both high speed and high precision are desired, while the huge amount of data collected, as mentioned previously supports great precision of the grating ruler, it poses significant limitation to the speed of measurement. Thus, it is a dilemma between high speed and high precision.

The presently common grating ruler mainly uses "Moire patterns", together with tests such as electronic subdivision and a data processing module to obtain displacement values. The existing grating ruler measuring system primarily has the following problems. For improving the precision for displacement measurement, the grating is desired to be made dense. With the increase of data obtained from the dense grating for each unit of displacement, the risk of "losing steps" during data acquisition increases, which jeopardize the authenticity of data. Particularly, for high-speed motion, the effect of "losing steps" is more significant. Thus, using devices with increasingly higher acquisition speed without deliberation can seriously increase the costs for making and using measuring systems.

China Patent No. CN200510010288.1 provides a method of measuring high-speed high-precision displacement based on two grating rulers. The core concept of the related art is that: a normal high-speed, high-precision positioning system does not have high-speed motion at the moment of positioning, and thus it is possible to use two grating rulers of different capacities to measure displacement, which include one coarse grating ruler for high-speed, low-definition measurement and one precise grating ruler for low-speed, high-definition measurement. When the positioning system has its motion shift to low speed form high speed, the method switch the counting pulses of the two grating rulers and synthesizes their counts, so as to obtain high-definition displacement value at the moment of positioning. In one of its specific counting schemes, a threshold of speed for switching is set. For high-speed motion, the coarse grating ruler measures displacement and speed. When the motion speed becomes below the set threshold, the precise grating ruler takes over for motion displacement. While the related art achieves high-speed, high-precision displacement measurement using grating rulers, it has some shortcomings: 1 it is unable to provide high-speed, high-precision displacement measurement throughout the whole course of motion, so is less applicable; and 2. it uses two grating rulers and thus requires more costs.

SUMMARY

The present disclosure provides a macro-micro composite grating ruler system that supports displacement measurement meeting the requirements for both high speed and high precision. It achieves high-speed and precise displacement measurement with low costs.

For achieving this objective, the present disclosure implements the following counting scheme:

a macro-micro composite grating ruler measuring system based on conversion and amplification in vertical and horizontal directions, the macro-micro composite grating ruler measuring system including a grating ruler, a macro-micro reading system moving with respect to the grating ruler, and a counting and an image processing module, and being characterized in:

the macro-micro reading system including a macro-scale reading module and a micro-scale reading module, the macro-scale reading module and the micro-scale reading module being fixedly positioned with respect to each other, the grating ruler having a surface provide with a grating strip band composed of grating strips, the macro-micro reading system facing a datum of the grating strips and being parallel to the grating ruler, and the macro-micro reading system and the grating ruler being separated by a certain distance;

the macro-scale reading module and the micro-scale reading module being connected to the counting and image processing module through communication cables; the micro-scale reading module including an image sensor and a lens, and the lens being placed in front of the image sensor; and the system further including a measuring reference line, the measuring reference line being a straight line or a set of straight lines that are parallel to each other, the measuring reference line together with the grating strips captured by the image sensor forming an image overlap in the counting and image processing module, and the measuring reference line and the grating strips including a certain angle θ in the image overlap.

The measuring reference line is a mark provided on the lens.

The measuring reference line is set in the counting and image processing module and generated by the counting and image processing module using an algorithm.

The system further includes an auxiliary light source illuminating a working scope of the image sensor, the auxiliary light source being fixed to the image sensor; the grating ruler being installed on an immovable rack, the macro-micro reading system being fixed to a moving component; and the macro-micro reading system and the grating ruler being separated by a distance between 0.5 mm and 1.5 mm.

The included angle θ satisfies a relation of tan θ=W/B, where W is a size of a grating pitch of the grating ruler, and B is a width of the grating strip band.

The image sensor is a CCD or CMOS camera.

The macro-scale reading module is a grating ruler reading head that has a reflective structure and is based on the measurement principle of Moire pattern formation, or a photoelectric sensing device that directly scans the grating strips.

The present disclosure also provides a measuring method using the macro-micro composite grating ruler measuring system, being characterized in:

the macro-scale reading module counting the grating strips passing therethrough during relative motion, and the counting and image processing module multiplying a counted number of pulses of the grating strips by the grating pitch so as to obtain a macro-scale displacement value at a precision level corresponding to a single grating pitch;

the counting and image processing module processing the image overlap, in which the measuring reference line and the grating strip form an intersection, and obtaining a micro-scale relative displacement s between the immovable rack and the moving component in a unit of grating pitch size by measuring a distance L0 where the intersection moves along the measuring reference line and using a proportion relation of $$\frac{s}{L0} = \sin\theta;$$

and the macro-scale relative displacement and the micro-scale relative displacement being added together to obtain a final relative displacement value between the immovable rack and the moving component.

Preferably, when the measuring reference line includes plural said measuring reference lines, measurement and calculation is performed on each of the measuring reference lines so as to obtain plural micro-scale relative displacement values, and an average of the micro-scale relative displacement values is taken as the final micro-scale relative displacement value.

Preferably, the image processing area processed by the counting and image processing module is limited to a slender lengthwise area having the measuring reference line as a center line thereof.

With the foregoing configuration, the present disclosure is compatible with the existing incremental grating rulers and absolute grating rulers, so is highly applicable. The system uses a high-speed, low-precision grating ruler to measure macro-scale displacement, and uses high-performance micro-scale reading module based on mechanical and optical subdivision technology to get authentic high-precision micro-scale displacement value, thus being an economic option for grating rulers with large grating pitches. Particularly, the disclosed measuring system can process images of multiple grating strips to further equalize manufacturing errors of the grating strips, thereby further improving the precision for displacement measurement.

Figure 1:
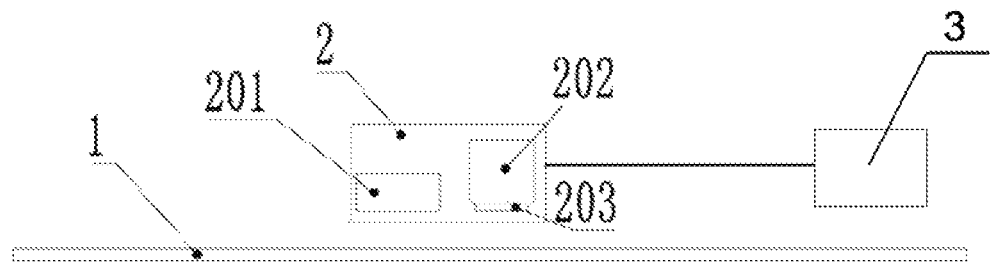
FIG. 1 is a schematic drawing illustrating one embodiment of the present disclosure.

Therein: grating ruler 1, grating strip 101, macro-micro reading system 2, macro-scale reading module 201, image sensor 202, lens 203, measuring reference line 204a, intersection 204b, mark 205, counting and image processing module 3, immovable rack 4, moving component 5.

DETAILED DESCRIPTION

The counting scheme of the disclosure will be best understood by reference to the following detailed description of illustrative embodiments when read in conjunction with the accompanying drawings.

As shown in FIG. 1, a macro-micro composite grating ruler measuring system based on conversion and amplification in vertical and horizontal directions includes a grating ruler 1, a macro-micro reading system 2 the moves with respect to the grating ruler 1, and a counting and image processing module 3.

As shown in FIG. 1, the macro-micro reading system 2 includes a macro-scale reading module 201 and a micro-scale reading module. The macro-scale reading module and the micro-scale reading module are fixedly positioned with respect to each other. The grating ruler 1 has its surface provide with a grating strip band composed of grating strips 101. The macro-micro reading system 2 faces the datum of the grating strips 101 and is parallel to the grating ruler 1. The macro-micro reading system 2 and the grating ruler 1 are separated by a certain distance.

The macro-scale reading module 201 and the micro-scale reading module are connected to the counting and image processing module 3 through communication cables. As shown in FIG. 1, the micro-scale reading module includes an image sensor 202 and a lens 203. The lens 203 is placed in front of the image sensor 202.

Figure 2:
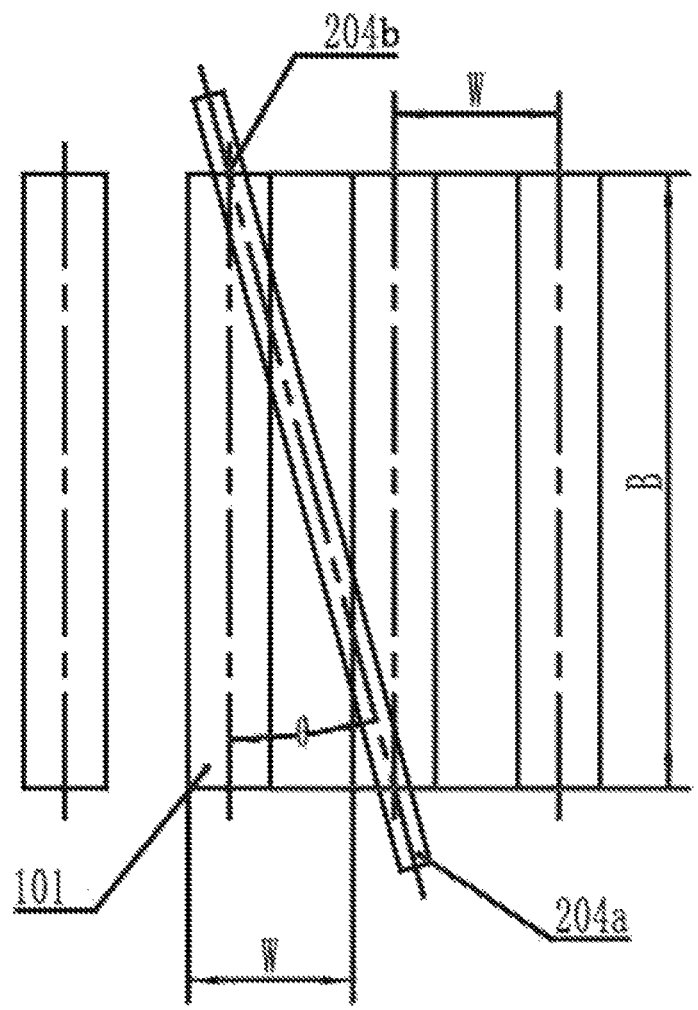
FIG. 2 is a schematic drawing illustrating an image overlap of a measuring reference line and a grating strip as obtained by an image sensor according to the embodiment of the present disclosure.
Figure 3:
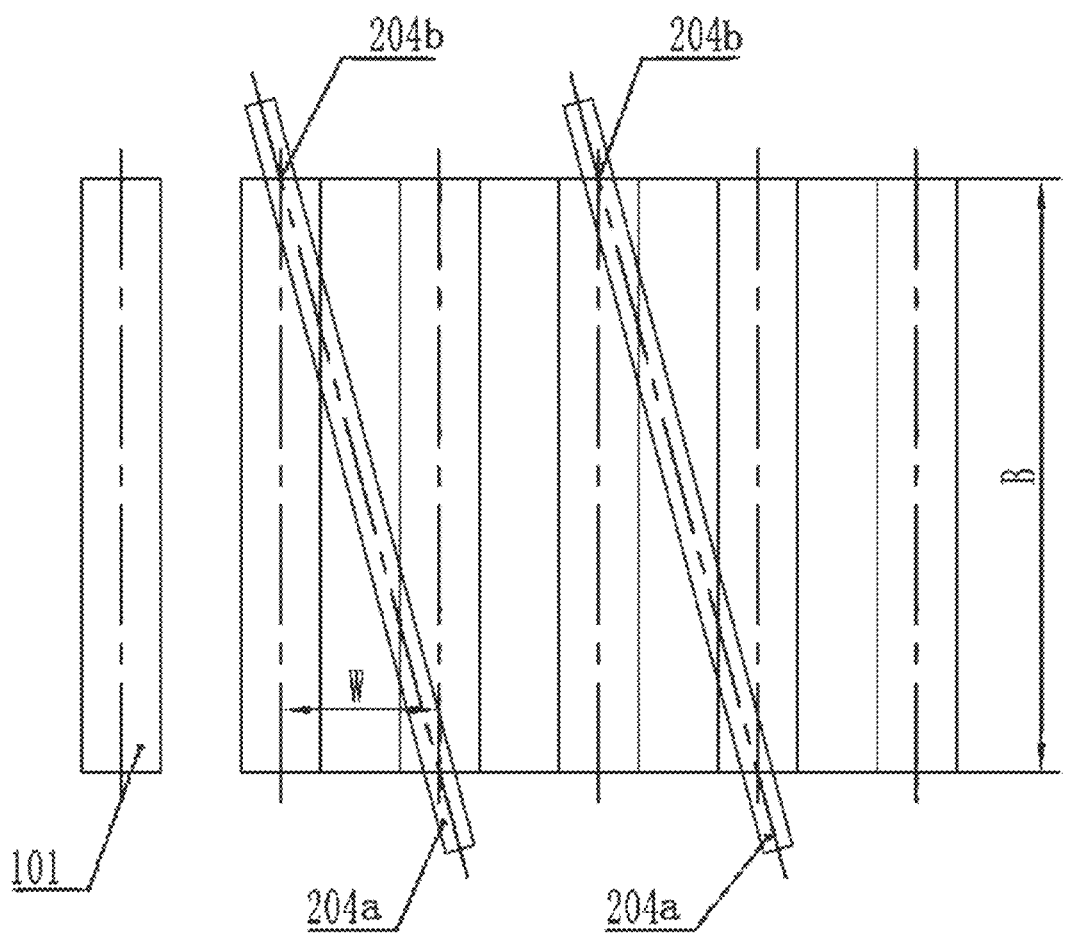
FIG. 3 is a schematic drawing illustrating an image overlap of multiple measuring reference lines and the grating strips according to the embodiment of the present disclosure.

As shown in FIG. 2 or FIG. 3, the system further includes a measuring reference line 204a. The measuring reference line 204a may be a straight line or a set of straight lines that are parallel to each other. The measuring reference line 204a obtained by the image sensor 202 together with the grating strips 101 forms an image overlap in the counting and image processing module 3. In the image overlap, the measuring reference line 204a and the grating strips 101 include a certain angle θ.

As shown in FIG. 2 or FIG. 3, the counting and image processing module 3 recognizes the image overlap, and identifies the center-line equation of the grating strip 101 and the measuring reference line 204a. The center line of the grating strip 101 and the measuring reference line 204a matches the included angle θ, so as to ensure that an intersection 204b is present according to the center-line equation. When there is relative displacement between the grating ruler 1 and the macro-micro reading system 2, the intersection 204b moves along the center line of the measuring reference line 204a correspondingly. The movement follows the following proportional relation of $$\frac{\Delta s}{\Delta L0} = \sin\theta,$$

where Δs is the relative displacement between the grating ruler 1 and the macro-micro reading system 2, and ΔL0 is the displacement of the intersection 204b along the center line of the measuring reference line 204a in the image overlap of the measuring reference line 204a as obtained by the counting and image processing module 3 and the grating strip 101.

Figure 4:
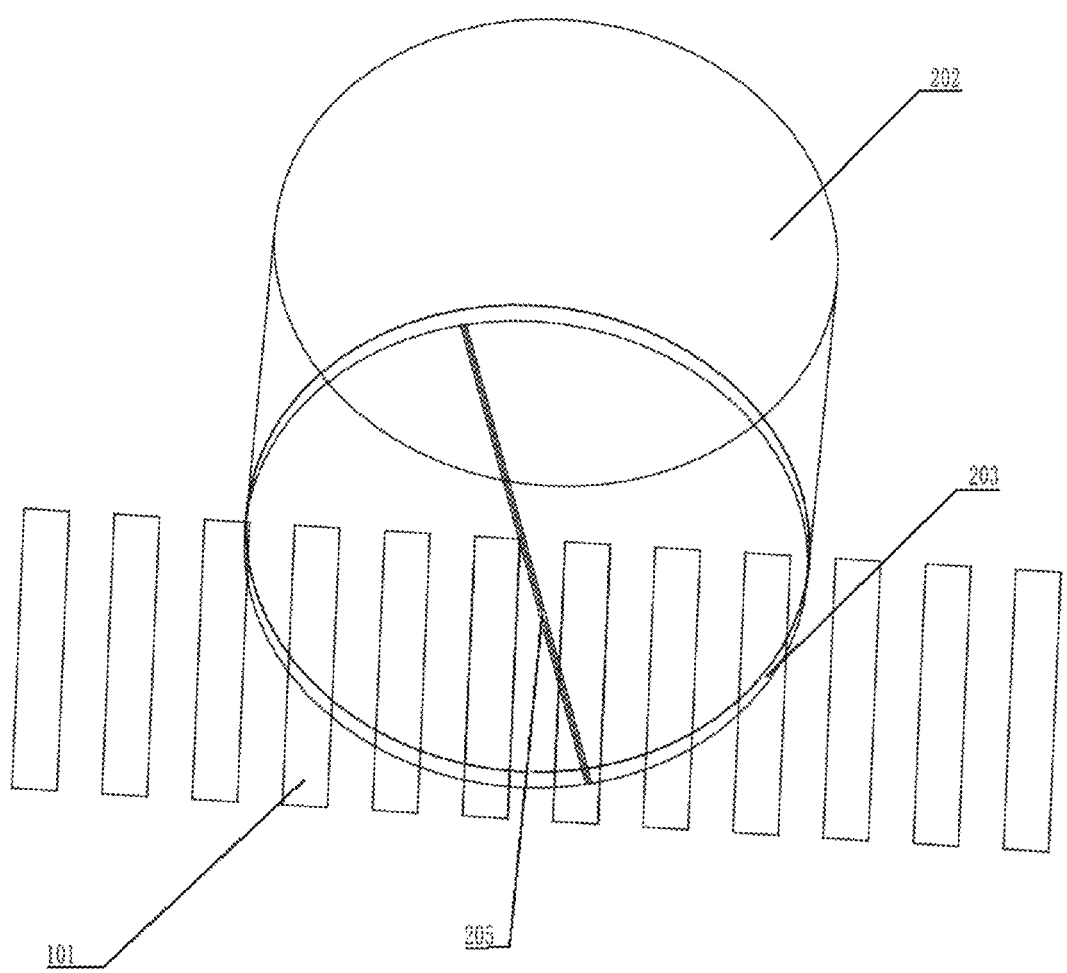
FIG. 4 is a schematic drawing illustrating an included angle between a lens mark and the grating strips according to the embodiment of the present disclosure.

The measuring reference line 204a contained in the counting and image processing module 3 may be obtained by any of the means described below. The first is a physical method. As shown in FIG. 4, the lens 203 is provided with a slender mark 205 or a mark set composed of plural parallel marks 205. The extending direction of the mark 205 or of the mark set straight line and the extending direction of the grating strips 101 include a certain angle θ. The image of the measuring reference line 204a contained in the counting and image processing module 3 is the image of the mark 205 of the lens 203 captured by the image sensor 202. The second is a software-based method. The counting and image processing module 3 process the image of the grating strips 101 captured by the image sensor 202. The counting and image processing module 3 has a straight-line generating algorithm built therein for generating a straight line or a set of parallel straight lines that work with the extending direction of the grating strips 101 to form the included angle θ. The image of the measuring reference line 204a contained in the counting and image processing module 3 is the image of the straight line or straight line set generated by the built-in algorithm.

Further included is an auxiliary light source. The auxiliary light source faces the working scope of the image sensor 202 and is fixed to the image sensor 202, so as to move with the image sensor 202. The auxiliary light source has its illumination focused on the image processing area of the image sensor 202, thereby providing lighting to the image sensor 202 and supporting the image sensor 202 to obtain quality images.

Figure 6:
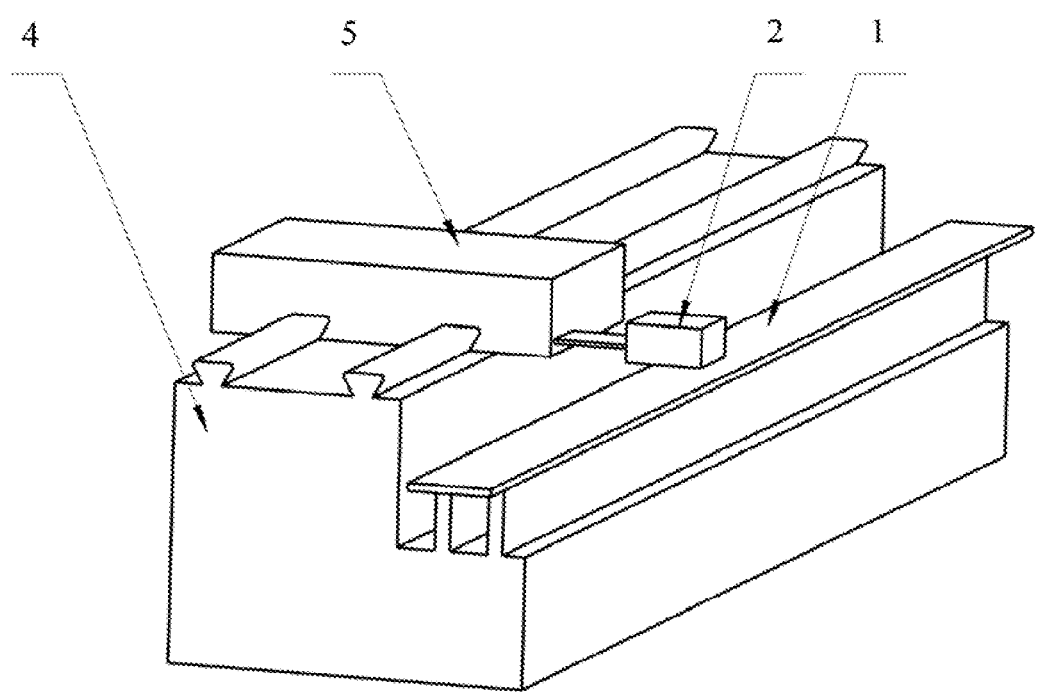
FIG. 6 is a schematic drawing illustrating a grating ruler measuring system.

The grating ruler 1 is installed onto an immovable rack 4. The macro-micro reading system 2 is fixed to a moving component 5, as shown in FIG. 6.

The macro-micro reading system 2 and the grating ruler 1 are separated by a distance between 0.5 mm and 1.5 mm.

The included angle θ satisfies the equation of tan θ=W/B, where W is the grating pitch of the grating ruler 1, and B is the width of the grating strip band. With this particular proportional relation, the measurement precision of the grating ruler 1 in each grating pitch can be enhanced.

The image sensor 202 is a CCD or CMOS camera.

The macro-scale reading module 201 may be a grating ruler reading head that has a reflective structure and is based on the measurement principle of Moire pattern formation, or a photoelectric sensing device that directly scans the grating strips 101.

The macro-micro composite grating ruler measuring system based on conversion and amplification in vertical and horizontal directions conducts measurement through the following steps.

In Step A, the macro-scale reading module 201 counts the grating strips 101 passing therethrough during the relative motion using the principle of Moire pattern formation or using a photoelectric sensing device. The counting and image processing module 3 multiplies the counted number of pulses of the grating strips 101 by the grating pitch so as to obtain a macro-scale displacement value at a precision level corresponding to a single grating pitch.

Figure 5:
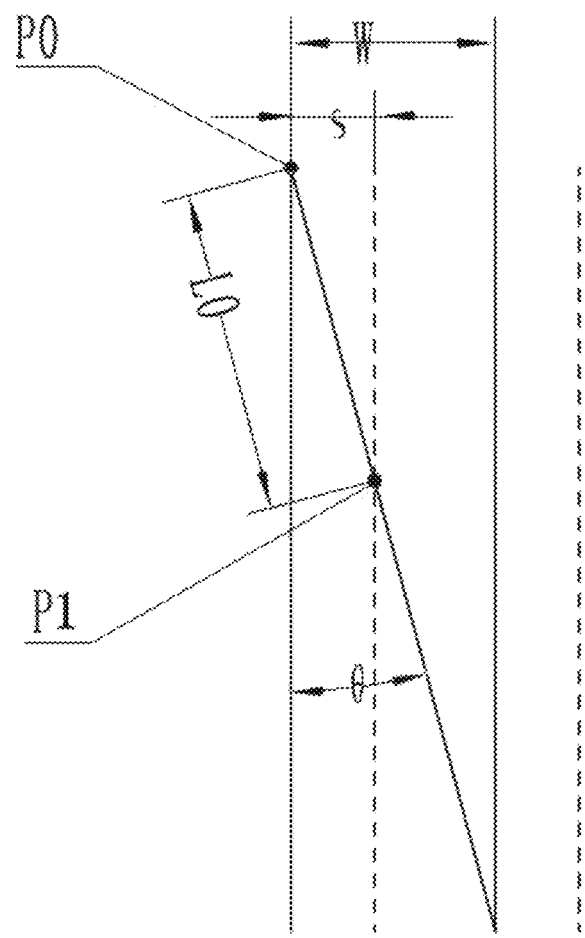
FIG. 5 explains the principle on which the measurement of the present disclosure depends.

In Step B, the image sensor 202 in the micro-scale reading module captures the image of the grating strips 101, and overlaps it on the image of the measuring reference line 204a in the counting and image processing module 3. The counting and image processing module 3 processes the image overlap, so as to obtain the datum center straight line equation 1 in the image of the grating strips 101 and the datum center straight line equation 2 of the measuring reference line.

$$x = \overline{V} \quad (1),$$

$$y = \tan\theta * x \quad (2),$$

wherein x and y are coordinates of the intersection 204b along x and y axes respectively, $\overline{V}$ is migration distance of the grating strips 101, and θ the included angle. The counting and image processing module 3 calculates coordinates of the intersection 204b between the datum center straight line equation 1 and the datum center straight line equation 2. An initial intersection P0 is selected, as shown in FIG. 5. When there is relative displacement between the macro-micro reading system 2 and the grating ruler 1, the intersection 204b between the datum center straight line equation 1 and the datum center straight line equation 2 moves along the datum center straight line equation 2. It is assumed that the moved intersection is P1. The counting and image processing module 3 calculates the distance between P0 and P1. It is assumed that the distance is L0. According to the proportional relation of $$\frac{s}{L0} = \sin\theta,$$

the counting and image processing module 3 obtains the micro-scale relative displacement of the macro-micro reading system 2 with respect to the grating ruler 1 in one grating pitch. The displacement is the high-precision micro-scale displacement value for a single grating pitch. When the datum center straight line equation 1 and the datum center straight line equation 2 form a set of intersections, the counting and image processing module 3 obtains plural micro-scale relative displacement values. The counting and image processing module 3 takes the average measurement as the final micro-scale displacement value. The micro-scale reading module performs cycle measurement on the displacement in a single grating pitch of the grating ruler 1, and does not perform accumulative measurement on the displacement in a multiple of one grating pitch size.

In Step C, the counting and image processing module 3 measures the relative displacement between the macro-micro reading system 2 and the grating ruler 1 by separately determining the macro-scale displacement in an integer multiple of the grating pitch size and the micro-scale displacement in a range smaller than one grating pitch. Therein, the macro-scale displacement of the integer multiple of the grating pitch size is obtained by multiplying the counted pulses of the grating strip and the grating pitch, while the micro-scale displacement for a range smaller than one grating pitch is obtained by analyzing the image. Then the displacement values obtained using the two reading modules are put into macro-micro composition. The disclosed macro-micro composite dual reading head grating ruler system is thus capable of obtaining highly precise displacement values rapidly.

Preferably, the image processing area processed by the counting and image processing module is limited to a slender lengthwise area having the measuring reference line 204a as its center line.

For the counting and image processing module, the image processing speed and the number of pixels contained in the image to be processed are inversely proportional to each other. In other words, the smaller the image processing area is, the higher the processing speed is. This technical scheme helps to significantly speed up image processing.

With the foregoing configuration, the present disclosure is compatible with the existing incremental grating rulers and absolute grating rulers, so is highly applicable. The system uses a high-speed, low-precision grating ruler to measure macro-scale displacement, and uses high-performance micro-scale reading module based on mechanical and optical subdivision technology to get authentic high-precision micro-scale displacement value, thus being an economic option for grating rulers with large grating pitches. Particularly, the disclosed measuring system can process images of multiple grating strips to further equalize manufacturing errors of the grating strips, thereby further improving the precision for displacement measurement.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A macro-micro composite grating ruler measuring system based on conversion and amplification in vertical and horizontal directions, the macro-micro composite grating ruler measuring system comprising a grating ruler, a macro-micro reading system moving with respect to the grating ruler, and a counting and an image processing module, wherein:
the macro-micro reading system comprises a macro-scale reading module and a micro-scale reading module, the macro-scale reading module and the micro-scale reading module being fixedly positioned with respect to each other, the grating ruler having a surface provided with a grating strip band composed of grating strips, the macro-micro reading system facing a datum of the grating strips and being parallel to the grating ruler, and the macro-micro reading system and the grating ruler being separated by a certain distance;
the macro-scale reading module and the micro-scale reading module are connected to the counting and image processing module through communication cables; the micro-scale reading module including an image sensor and a lens, and the lens being placed in front of the image sensor; and
the system further comprises a measuring reference line, the measuring reference line being a straight line or a set of straight lines that are parallel to each other, the measuring reference line together with the grating strips captured by the image sensor forming an image overlap in the counting and image processing module, and the measuring reference line and the grating strips including a certain angle θ in the image overlap.

2. The macro-micro composite grating ruler measuring system of claim 1, wherein the measuring reference line is a mark provided on the lens.

3. The macro-micro composite grating ruler measuring system of claim 1, wherein the measuring reference line set in the counting and image processing module is generated by the counting and image processing module using an algorithm.

4. The macro-micro composite grating ruler measuring system of claim 1, further comprising an auxiliary light source illuminating a working scope of the image sensor, the auxiliary light source being fixed to the image sensor; the grating ruler being installed on an immovable rack, the macro-micro reading system being fixed to a moving component; and the macro-micro reading system and the grating ruler being separated by a distance between 0.5 mm and 1.5 mm.

5. The macro-micro composite grating ruler measuring system of claim 1, wherein the included angle θ satisfies a relation of tan θ=W/B, where W is a grating pitch of the grating ruler, and B is a width of the grating strip band.

6. The macro-micro composite grating ruler measuring system of claim 1, wherein the image sensor is a CCD or CMOS camera.

7. The macro-micro composite grating ruler measuring system of claim 1, wherein the macro-scale reading module is a grating ruler reading head that has a reflective structure and is based on the measurement principle of Moire pattern formation, or a photoelectric sensing device that directly scans the grating strips.

8. A measuring method using a macro-micro composite grating ruler measuring system,
the macro-micro composite grating ruler measuring system based on conversion and amplification in vertical and horizontal directions, the macro-micro composite grating ruler measuring system comprising a grating ruler, a macro-micro reading system moving with respect to the grating ruler, and a counting and an image processing module, wherein:
the macro-micro reading system comprises a macro-scale reading module and a micro-scale reading module, the macro-scale reading module and the micro-scale reading module being fixedly positioned with respect to each other, the grating ruler having a surface provide with a grating strip band composed of grating strips, the macro-micro reading system facing a datum of the grating strips and being parallel to the grating ruler, and the macro-micro reading system and the grating ruler being separated by a certain distance;
the macro-scale reading module and the micro-scale reading module are connected to the counting and image processing module through communication cables; the micro-scale reading module including an image sensor and a lens, and the lens being placed in front of the image sensor; and the system further comprises a measuring reference line, the measuring reference line being a straight line or a set of straight lines that are parallel to each other, the measuring reference line together with the grating strips captured by the image sensor forming an image overlap in the counting and image processing module, and the measuring reference line and the grating strips including a certain angle θ in the image overlap, wherein:

the macro-scale reading module counting the grating strips passing therethrough during relative motion, and the counting and image processing module multiplying a counted number of pulses of the grating strips by the grating pitch so as to obtain a macro-scale relative displacement at a precision level corresponding to a single grating pitch;

the counting and image processing module processing the image overlap, in which the measuring reference line and the grating strip form an intersection, and obtaining a micro-scale relative displacement s between an immovable rack and a moving component in a unit of grating pitch size by measuring a distance L0 where the intersection moves along the measuring reference line and using a proportion relation of $s/L0 = \sin \theta;$ and the macro-scale relative displacement and the micro-scale relative displacement being added together to obtain a final relative displacement value between the immovable rack and the moving component.

9. The measuring method of claim 8, wherein when the measuring reference line comprises plural said measuring reference lines, measurement and calculation is performed on each of the measuring reference lines so as to obtain plural micro-scale relative displacement values, and an average of the micro-scale relative displacement values is taken as the final micro-scale relative displacement value.

10. The measuring method of claim 8, wherein the image processing area processed by the counting and image processing module is limited to a slender lengthwise area having the measuring reference line as a center line thereof.

* * * * *